United States Patent [19]
Yamamoto et al.

[11] 4,381,883
[45] May 3, 1983

[54] LIGHT ABSORPTIVE FILM PROVIDED WITH A REFLECTION PREVENTIVE MEANS

[75] Inventors: Kimiaki Yamamoto, Hachiouji; Takaharu Koike, Ina, both of Japan

[73] Assignee: Olympus Optical Co., Ltd., Tokyo, Japan

[21] Appl. No.: 164,936

[22] Filed: Jul. 1, 1980

[30] Foreign Application Priority Data

Jul. 3, 1979 [JP] Japan .................................. 54-84160

[51] Int. Cl.³ .............................................. G02B 1/10
[52] U.S. Cl. .................................................... 350/164
[58] Field of Search ................................. 350/163–166

[56] References Cited

U.S. PATENT DOCUMENTS

| | | | |
|---|---|---|---|
| 2,647,441 | 8/1953 | Boydston et al. | 350/164 |
| 3,649,359 | 3/1972 | Apfel et al. | 350/166 |

OTHER PUBLICATIONS

Pacey, D. J., "Multilayer Anti-reflection Coatings for Optical Components", *Manufacturing Optics International*, vol. 22, No. 5, Nov. 1969, pp. 270, 271, 273, 275-277, 279, 281 and 283.

Kard, P. G., "Theory of Increasing the Transparency of Metallic Coatings", *Optics and Spectroscopy*, vol. 9, No. 2, Aug. 1960, pp. 129-131.

Reele, Cavlo, "Reflectance of Metallic Films Coated with Dielectric Layers", *Manufacturing Optician International*, vol. 22, No. 1, Jul. 1969, pp. 9 and 11-13.

*Primary Examiner*—Bruce Y. Arnold
*Attorney, Agent, or Firm*—Cushman, Darby & Cushman

[57] ABSTRACT

A light absorptive film comprising a light absorptive metallic layer and layer of dielectric material arranged on the incidence side of said light absorptive metallic layer, said light absorptive film being so adapted as to reduce reflection on said metallic layer by composing it in such a manner that the reflected wave produced at the boundary surface between said metallic layer and said layer of dielectric material is canceled by the reflected wave produced at the boundary surface of the other side of said metallic layer.

6 Claims, 4 Drawing Figures

LIGHT-ABSORPTIVE FILM PROVIDED WITH A REFLECTION PREVENTIVE MEANS

BACKGROUND OF THE INVENTION (a) Field of the Invention

The present invention relates to a light absorptive film adapted to reduce reflection.

(b) Description of the Prior Art

Optical elements such as filters utilizing absorption of light due to metals for shielding or attenuating light are used in various optical systems. Light absorptive films utilizing absorption of light due to metals generally show higher reflectance. Therefore, in optical systems using optical elements such as the above-described light absorptive films, flare or ghost produced by said optical elements may hinder observation. The phase plate used in the phase contrast microscope, for example, is so adapted as to cause phase advance (or phase delay) of $\lambda/4$ at the ring-like portion on which the zero order diffracted rays are focused and, at the same time, to show adequate absorption as is well known to those skilled in the art. For this purpose, the phase plate is usually evaporation-coated with a metal so as to show absorption. Due to the fact that the metal has a high absorption coefficient and a high reflectance, flare is produced by the reflection and degrades performance of the phase contrast microscopes.

SUMMARY OF THE INVENTION

A general object of the present invention is to provide a light absorptive film so adapted as to show low reflectance by providing a reflection reduction means on a metallic film having a high absorption coefficient for reducing reflection thereon.

DETAILED DESCRIPTION OF THE PREFERRED EMBODIMENTS

Figure 1:
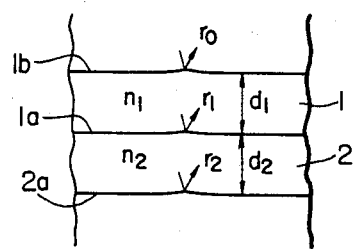
FIG. 1 shows a diagram illustrating the principle of the light absorptive film according to the present invention.

The light absorptive film according to the present invention is so designed as to reduce reflection on a metallic film comprising therein as a layer having reflectance high enough to produce intense reflection light by utilizing said metallic film as one of the layers of a reflection reduction film. The principle of the present invention will be described with reference to the accompanying drawings. The light absorption film according to the present invention consists of a film of dielectric material 1 and a metallic film 2 as shown in FIG. 1 so that intense reflection light $r_1$ produced on contact surface 1a between the film of the dielectric material and metallic film is canceled by composite light of reflection light $r_2$ produced on a rear surface 2a of the metallic film 2 and reflection wave produced on the surface of the film of the dielectric material. In FIG. 1 let us assume that the refractive index of the film of dielectric material 1, arranged as the first layer, is represented by $n_1$, the thickness of the first layer is designated by $d_1$, the complex refractive index of the metallic film arranged as the second layer is denoted by $n_2 (= n_2' - ik)$; the thickness of the second layer is represented by $d_2$; and the reflectance of the individual boundary surfaces is represented by $r_0$, $r_1$ and $r_2$, respectively. The layer over the boundary surface 1b and that under the boundary surface 2a may consist of air or glass, or the layer over the boundary surface 1b may be a film of dielectric material and the layer under the boundary surface 2a may consists of optional multiple films of materials including metals. In case of multiple films as described above, the reflectance of the boundary surfaces of all the layers of multiple films is to be regarded as equivalent to the reflectance $r_0$ and $r_2$ respectively.

When light is incident vertically from above on the surfaces shown in FIG. 1, the composite reflectance R is given by the following equation:

$$R = \frac{\left[ |r_0| + \frac{1}{|a|} \{-|r_1| + |r_2|e^{-\gamma}e^{i(\theta_2 - \theta_1 - \delta_2 \mp \pi)}\}e^{i(\theta_1 - \theta_0 - \alpha - \delta_1 \pm \pi)} \right] e^{i\theta_0}}{1 + \frac{|r_0|}{|a|} \{-|r_1| + |r_2|e^{-\gamma}e^{i(\theta_2 - \theta_1 - \delta_2 \mp \pi)}\}e^{i(\theta_1 + \theta_0 - \alpha - \delta_1 \pm \pi)}} \quad (1)$$

wherein $$r_0 = |r_0|e^{i\theta_0}, r_1 = |r_1|e^{i\theta_1}, r_2 = |r_2|e^{i\theta_2}$$

$$1 + |r_1||r_2|e^{-\gamma}e^{-i\delta_2} = |a|e^{i\alpha}$$

$$\delta_1 = \frac{4\pi n_1 d_1}{\lambda}, \delta_2 = \frac{4\pi n_2 d_2}{\lambda} = d_2 - i\gamma$$

Therefore, it is possible to reduce reflection by selecting $n_1$, $n_2$ and $d_1$, and $d_2$ so as to satisfy the amplitude condition represented by the equation (2) and the phase conditions represented by equations (3) and (4):

$$|r_0| - \frac{|r_1|}{|a|} + \frac{e^{-\gamma}|r_2|}{|a|} = 0 \quad (2)$$

$$\delta_2 = \frac{4\pi n_2' d_2}{\lambda} = \theta_2 - \theta_1 \mp \pi \quad (3)$$

$$\delta_1 = \frac{4\pi n_1 d_1}{\lambda} = \theta_1 - \theta_0 - \alpha \pm \pi \quad (4)$$

The equations (2) through (4) may not be satisfied strictly in practice. When the condition of equation (2) is satisfied strictly, for example, it will still be possible to obtain a rather satisfactory reflection reduction effect if $\delta_1$ in equation (4) is within $\pm 0.4\pi$ of the defined value and if $\delta_2$ in equation (3) is within $\pm 0.3\pi$ of the defined value. That is to say, sufficient reflection reduction effect is obtainable when $n_1d_1$ and $n_2d_2$ have values within the ranges defined by the following conditions:

$$(\theta_1 - \theta_0 + 0.6\pi)\frac{\lambda}{4\pi} \leq n_1d_1 \leq (\theta_1 - \theta_0 + 1.4\pi)\frac{\lambda}{4\pi}$$

$$(\theta_2 - \theta_1 - 1.3\pi)\frac{\lambda}{4\pi} \leq n_2d_2 \leq (\theta_2 - \theta_1 - 0.7\pi)\frac{\lambda}{4\pi}$$

or $$(\theta_1 - \theta_0 - 1.4\pi)\frac{\lambda}{4\pi} \leq n_1d_1 \leq (\theta_1 - \theta_0 - 0.6\pi)\frac{\lambda}{4\pi}$$

$$(\theta_2 - \theta_1 + 0.7\pi)\frac{\lambda}{4\pi} \leq n_2d_2 \leq (\theta_2 - \theta_1 + 1.3\pi)\frac{\lambda}{4\pi}$$

Further, as is clarified by minute examinations, equation (3) is strictly satisfied when the refractive index $n_1$ is different from the refractive index $n_3$ of the layer under the boundary surface 2a, and equations (2) through (4) can easily be satisfied by using a dielectric material having a high refractive index in the first layer so as to obtain a favorable reflection reduction effect. Now, an embodiment of the light absorptive film according to the present invention provided with a reflection reduction means on the basis of the above-described theory will be explained. In the composition shown in FIG. 1, a film of a dielectric material having refractive index $n_1 = 2.33$ and thickness $d_1 = 38.6$ m$\mu$ is shown formed on a glass plate having a refractive index No.$= 1.52$, a metallic film having refractive index $n_2 = 1.97 - 2.1i$ and thickness $d_2 = 20.3$ m$\mu$ is shown as the film 2 of the second layer; and the layer below the second layer consists of air. The light absorptive film having such a composition shows the spectroscopic reflectance characteristic visualized by the curve a in FIG. 3. It is possible to obtain a light absorptive film having a reflectance sufficiently smaller than that of conventional films by selecting the refractive index n and the thickness d of the layer of dielectric material, as well as the complex refractive index $n'-ik$ and the thickness $d'$ of the metallic layer to be within the ranges defined by the following conditions.

| | |
|---|---|
| $1.6 \leq n \leq 2.7$ | $10 < d < 40$ |
| $1.4 \leq n' \leq 2.8$ | $20 < d' < 50$ |
| $1.2 \leq k \leq 3.5$ | |

The embodiment described above has numerical values selected within these ranges.

Now, a phase plate for use with a phase contrast microscope will be described as a second embodiment of the light absorptive film provided with a reflection reduction means according to the present invention.

Figure 2:
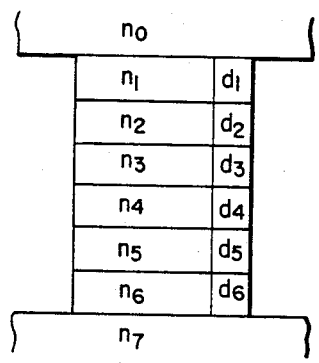
FIG. 2 shows a diagram illustrating the composition of the light absorptive film according to the present invention used as a phase plate.

FIG. 2 shows a phase plate comprising the light absorption film according to the present invention. This phase plate consists of six layers of films arranged between glass plates including the first and second layers designed as the films having a reflection reduction function on the basis of the principle according to the present invention. The second layer is a film having the light absorptive function in the phase plate and the first layer of a dielectric material film is formed on the incidence side surface of said second layer. The fifth layer serves for adjusting the light absorption ratio required for a phase plate, whereas the sixth layer is a film to cause phase difference. Specific numerical values of this embodiment are listed below:

| | | |
|---|---|---|
| Glass plate | $n_0 = 1.52$ | |
| First layer | $n_1 = 2.33$ | $d_1 = 30$ m$\mu$ |
| Second layer | $n_2 = 1.97-2.1i$ | $d_2 = 20.3$ m$\mu$ |
| Third layer | $n_3 = 1.33$ | $d_3 = 90.2$ m$\mu$ |
| Fourth layer | $n_4 = 2.33$ | $d_4 = 21.5$ m$\mu$ |
| Fifth layer | $n_5 = 1.97-2.1i$ | $d_5 = 10$ m$\mu$ |
| Sixth layer | $n_6 = 1.33$ | $d_6 = 624$ m$\mu$ |
| Glass plate | $n_7 = 1.52$ | |

Figure 3:
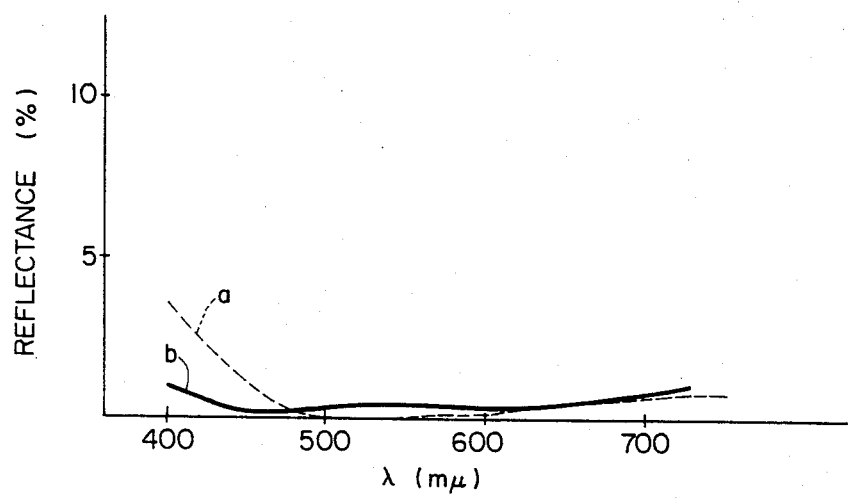
FIG. 3 shows a graph illustrating reflectance of the light absorptive film according to the present invention.
Figure 4:
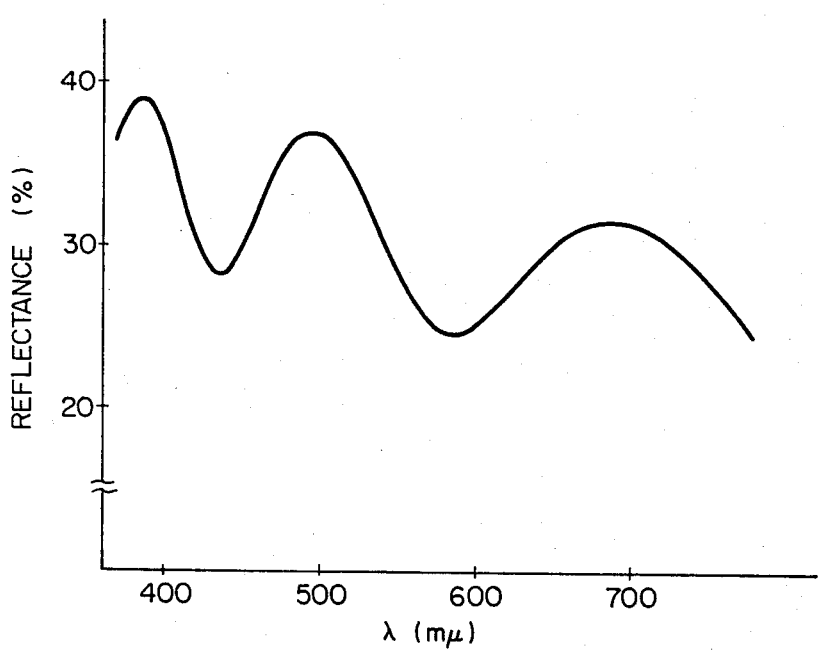
FIG. 4 shows a graph illustrating reflectance of the conventional light absorptive film.

The phase plate shown in FIG. 2 has reflectance characteristic shown by the curve b in FIG. 3. The reflectance characteristic of the conventional phase difference plate (consisting of a first layer of a dielectric material film and a second layer of a metallic film which are arranged between glass plates) is illustrated in FIG. 4. Comparison between the characteristics shown in these drawings will clarify that the phase plate according to the present invention can assure a reflection reduction effect. Therefore, the phase plate according to the present invention makes it possible to favorably carry out microscopy with phase contrast microscopes without being affected by flare or ghost.

The present invention is not limited to the embodiments described above. For example, it is possible to arrange a third layer or multiple layers of dielectric material on the emerging side surface of the second layer (metallic film 2) in the embodiment shown in FIG. 1. In this case, it will be effective to select for the first layer located on the incidence side of the metallic film a refractive index which is higher than the refractive index of the third layer or the layer in contact with the metallic layer in case of the multiple layers. In other words, a film of dielectric material having a high refractive index is used as the first layer, a metallic film is adopted as the second layer, and a film of a dielectric material having a low refractive index is employed as the third layer (or the layer in contact with the metallic film in case of multiple layers). In order to form the layers of dielectric material and metallic film including the multiple layers, it is possible to use various materials which have already been known well to those skilled in the art.

As is clear from the foregoing descriptions, the light absorptive film according to the present invention is effective to remarkably reduce reflection due to metals, thereby making it possible to design optical systems which permit observation without being affected by flare or ghost. For example, the light absorption film according to the present invention can be used as a phase plate which permits favorable phase contrast microscopy.

We claim:

1. A light absorptive film provided with reflection reduction means, said film comprising a light absorptive metallic layer and a layer of dielectric material arranged on the incidence side of said light absorptive layer, wherein the refractive index and thickness of said metallic layer and the refractive index and thickness of said dielectric material layer is selected in such a manner that the reflected wave produced on the boundary surface between said metallic layer and said layer of dielectric material is canceled by the reflected wave produced on the other surface of said metallic layer, said film satisfying the following condition, $$|r_0| + |r_2| \geq |r_1|,$$

wherein $r_0 = |r_0|e^{i\theta_0}$ represents reflectance on the surface of said dielectric material arranged on the incidence side, $r_1 = |r_1|e^{i\theta_1}$ designates reflectance on the boundary surface between said layer of the dielectric material and said metallic layer, and $r_2 = |r_2|e^{i\theta_2}$ denotes reflectance on the emerging side surface of said metallic layer and wherein the conditions mentioned below are satisfied:

$$(\theta_1 - \theta_0 + 0.6\pi)\frac{\lambda}{4\pi} \leq n_1 d_1 \leq (\theta_1 - \theta_0 + 1.4\pi)\frac{\lambda}{4\pi}$$

$$(\theta_2 - \theta_1 - 1.3\pi)\frac{\lambda}{4\pi} \leq n_2 d_2 \leq (\theta_2 - \theta_1 - 0.7\pi)\frac{\lambda}{4\pi} \text{ or}$$

$$(\theta_1 - \theta_0 - 1.4\pi)\frac{\lambda}{4\pi} \leq n_1 d_1 \leq (\theta_1 - \theta_0 - 0.6\pi)\frac{\lambda}{4\pi}$$

$$(\theta_2 - \theta_1 + 0.7\pi)\frac{\lambda}{4\pi} \leq n_2 d_2 \leq (\theta_2 - \theta_1 + 1.3\pi)\frac{\lambda}{4\pi} \text{ wherein}$$

$$\theta_1 - \theta_0 < 0 \text{ and } \theta_2 - \theta_1 > 0.$$

2. A light absorptive film according to claim 1 satisfying the following conditions:

| | |
|---|---|
| $1.6 \leq n \leq 2.7$ | $10 < d < 40$ |
| $1.4 \leq n' \leq 2.8$ | $20 < d' < 50$ |
| $1.2 \leq k \leq 3.5$ | | wherein n represents the refractive index of said layer of dielectric material, d designates the thickness, in m$\mu$, of said layer of dielectric material, n'-ik denotes the complex refractive index of said metallic layer and d' represents the thickness, in m$\mu$, of said metallic layer.

3. A light absorptive film according to claim 2 wherein said layer of dielectric material has a refractive index of 2.33 and a thickness of 38.6 m$\mu$, said metallic layer has a refractive index of 1.97-2.1i and a thickness of 20.3 m$\mu$, and wherein a glass plate having a refractive index of 1.52 is arranged on the incidence side of said layer of dielectric material.

4. A light absorptive film according to claim 2 having the following composition:

| | | |
|---|---|---|
| Glass plate | $n_0 = 1.52$ | |
| First layer | $n_1 = 2.33$ | $d_1 = 30$ m$\mu$ |
| Second layer | $n_2 = 1.97-2.1i$ | $d_2 = 20.3$ m$\mu$ |
| Third layer | $n_3 = 1.33$ | $d_3 = 90.2$ m$\mu$ |
| Fourth layer | $n_4 = 2.33$ | $d_4 = 21.5$ m$\mu$ |
| Fifth layer | $n_5 = 1.97-2.1i$ | $d_5 = 10$ m$\mu$ |
| Sixth layer | $n_6 = 1.33$ | $d_6 = 624$ m$\mu$ |
| Glass plate | $n_7 = 1.52$ | | wherein $n_0$ through $n_7$ represent the refractive indices of said glass plates and individual layers, $d_1$ through $d_6$ designate the thicknesses, in m$\mu$ of the individual layers, $n_1$ corresponds to the symbol n in claim 2, the real number part of $n_2$ corresponds to n' in claim 2, the imaginary number part of $n_2$ corresponds to k in claim 2, $d_1$ corresponds to d in claim 2, and $d_2$ corresponds to d' in claim 2.

5. A light absorptive film according to claim 1 including an additional layer of dielectric material provided on the emerging side surface of said metallic layer, and wherein said additional layer of dielectric material has a refractive index lower than the layer of dielectric material on the incidence side surface of said metallic layer.

6. A light absorptive film provided with a reflection reduction means having the following composition:

| | | |
|---|---|---|
| Glass plate | $n_0 = 1.52$ | |
| First layer | $n_1 = 2.33$ | $d_1 = 30$ m$\mu$ |
| Second layer | $n_2 = 1.97-2.1i$ | $d_2 = 20.3$ m$\mu$ |
| Third layer | $n_3 = 1.33$ | $d_3 = 90.2$ m$\mu$ |
| Fourth layer | $n_4 = 2.33$ | $d_4 = 21.5$ m$\mu$ |
| Fifth layer | $n_5 = 1.97-2.1i$ | $d_5 = 10$ m$\mu$ |
| Sixth layer | $n_6 = 1.33$ | $d_6 = 624$ m$\mu$ |
| Glass plate | $n_7 = 1.52$ | | wherein $n_0$ through $n_7$ represent refractive indices of said glass plates and individual layers, and $d_1$ through $d_6$ designate the thicknesses of the individual layers.

* * * * *